(12) United States Patent
McColloch

(10) Patent No.: US 8,047,856 B2
(45) Date of Patent: Nov. 1, 2011

(54) ARRAY CONNECTOR FOR OPTICAL TRANSCEIVER MODULE

(75) Inventor: Laurence Ray McColloch, Santa Clara, CA (US)

(73) Assignee: Avago Technologies Fiber IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 12/711,379

(22) Filed: Feb. 24, 2010

(65) Prior Publication Data

US 2011/0207344 A1 Aug. 25, 2011

(51) Int. Cl.
*H01R 4/38* (2006.01)
(52) U.S. Cl. .......................................... 439/71; 439/331
(58) Field of Classification Search .......... 439/326–328, 439/79, 540, 1, 541.5, 71, 331, 83
See application file for complete search history.

(56) References Cited

U.S. PATENT DOCUMENTS

| | | | |
|---|---|---|---|
| 6,971,887 B1 * | 12/2005 | Trobough | ........................ 439/71 |
| 7,070,420 B1 * | 7/2006 | Wakefield et al. | .............. 439/66 |
| 7,137,744 B2 | 11/2006 | Wang et al. | |
| 7,245,498 B2 | 7/2007 | Togami et al. | |
| 7,329,054 B1 | 2/2008 | Epitaux et al. | |
| 7,350,984 B1 | 4/2008 | Togami et al. | |
| 7,455,463 B2 | 11/2008 | Togami et al. | |
| 7,687,313 B2 * | 3/2010 | Karnezos | ........................ 438/107 |
| 7,727,858 B2 * | 6/2010 | Kinsman et al. | .............. 438/455 |
| 7,806,994 B2 * | 10/2010 | Smith et al. | ................... 148/400 |
| 7,807,512 B2 * | 10/2010 | Lee et al. | ........................ 438/127 |
| 2004/0029411 A1 * | 2/2004 | Rathburn | ........................ 439/66 |

FOREIGN PATENT DOCUMENTS

WO WO-9615551 5/1996

OTHER PUBLICATIONS

FCI, "MEG-Array Connector System," printed from Internet Jan. 27, 2010 <www.fciconnect.com/megarray>.

* cited by examiner

*Primary Examiner* — Neil Abrams
*Assistant Examiner* — Phuongchi Nguyen

(57) ABSTRACT

A connector having a Ball-Grid Array on one side of a connector circuit board and a socket recess on the other side of the connector circuit board can be used to mate an opto-electronic transceiver module to a system circuit board. A base portion of the transceiver module can be received in the socket recess. Within the socket recess, an exposed portion of the connector circuit board has an array of resilient conductive contacts corresponding to an array of conductive pads on the lower surface of the base portion of the transceiver module.

11 Claims, 6 Drawing Sheets

ARRAY CONNECTOR FOR OPTICAL TRANSCEIVER MODULE

BACKGROUND

In an optical communication system, it is generally necessary to couple an optical fiber to an opto-electronic transmitter, receiver or transceiver device and to, in turn, couple the device to an electronic system such as a switching system or processing system. These connections can be facilitated by modularizing the transceiver device. Such transceiver modules include a housing in which are mounted opto-electronic elements, optical elements, and electronic elements, such as one or more light sources (e.g., lasers), light sensors, lenses and other optics, digital signal driver and receiver circuits, etc. In addition, a transceiver module typically includes an optical connector that can be coupled to a mating connector at the end of a fiber-optic cable. Various transceiver module configurations are known.

Some types of electronic devices can be mounted directly on the surface of a circuit board. Such "surface-mount technology" (SMT) can provide a greater density of electrical contacts between the device and the board than prior technologies. Some surface-mount devices include a rectangular array of electrical contacts on their lower surfaces that can be connected to corresponding electrical contacts on the surface of the circuit board. For example, microprocessors and similarly complex integrated circuit devices typically include such an array of electrical contacts. The array of electrical contacts on the lower surface of such a device can be, for example, of a type known as Ball Grid Array (BGA). A BGA connector comprises a planar array of metallic bumps or balls formed on the lower surface of the connector. A BGA connector can be connected to a circuit board by soldering the bumps to corresponding metallic pads on the surface of the circuit board using surface-mount solder technology. Not only integrated circuit devices but also various types of connectors and adapters can include BGA and similar electrical contact arrays.

While BGA electrical contacts are common, various other types of electrical contact arrays are also known. One family of electrical contact array includes those that have resilient contacts rather than solderable bumps or similar solderable leads. This family of connectors includes a type of connector known as the Landing Grid Array (LGA). An LGA connector comprises an array of resilient contact fingers or spring fingers. A device having an LGA connector can be connected to a circuit board by orienting the device in a position in which the resilient fingers are vertically aligned with corresponding metallic pads on the circuit board surface and then providing a force that resiliently compresses or flexes the fingers against the metallic pads. In a typical LGA, the fingers are very small and flex only a few mils (i.e., thousandths of an inch) or a few tens of mils toward the metallic pads. A retaining mechanism must be employed to maintain the device in this state, i.e., to counteract the spring force and thus maintain good electrical and mechanical contact between the fingers and the pads.

SUMMARY

Embodiments of the present invention relate to a connector for connecting an opto-electronic transceiver module to a system circuit board. The connector includes a housing with an upper surface, a lower surface, and a relatively thin, chip-like shape. The housing of the connector has least one socket recess for receiving the base portion of the transceiver module. The connector further includes a connector circuit board. A first portion of the housing covers a portion of one side or surface of the connector circuit board. The socket recess is in a second portion of the housing. A portion of the first side or surface of the connector circuit board is exposed through the socket recess. The exposed portion of the connector circuit board has an array of conductive pads corresponding to the array of resilient conductive contacts of the transceiver module.

The socket recess has a shape substantially corresponding to the shape of the base portion of the transceiver module, so that the base portion can be securely or snugly received in the socket recess of the connector when the transceiver module is mated with the connector. When the transceiver module is mated with the connector, an array of resilient conductive contacts in a base portion of the transceiver module makes electrical contact with a corresponding array of conductive pads on the first side or surface of the connector circuit board. Applying a force to the transceiver module with respect to the system circuit board both urges the base portion of the transceiver module into the socket recess and resiliently engages the resilient conductive contacts of the transceiver module array with the conductive pads of the connector circuit board. A retaining means, such as a fastening system or a locking engagement, can be included for retaining the transceiver module in a state in which the base portion is retained in the socket recess of the housing and the resilient conductive contacts of the transceiver module array are resiliently engaged with the conductive pads of the connector circuit board.

The second surface of the connector circuit board has a Ball Grid Array (BGA). The BGA can be soldered to corresponding electrical contact pads on the surface of the system circuit board. When the BGA is soldered to the surface of the system circuit board, and the transceiver module is electrically and mechanically mated with the connector as described above, the transceiver module is retained in the connector, and electrical connections or between the electronic and opto-electronic elements of the transceiver module and circuitry on the system circuit board are completed.

Other systems, methods, features, and advantages will be or become apparent to one with skill in the art upon examination of the following figures and detailed description. It is intended that all such additional systems, methods, features, and advantages be included within this description, be within the scope of the specification, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention.

DETAILED DESCRIPTION

Figure 1:
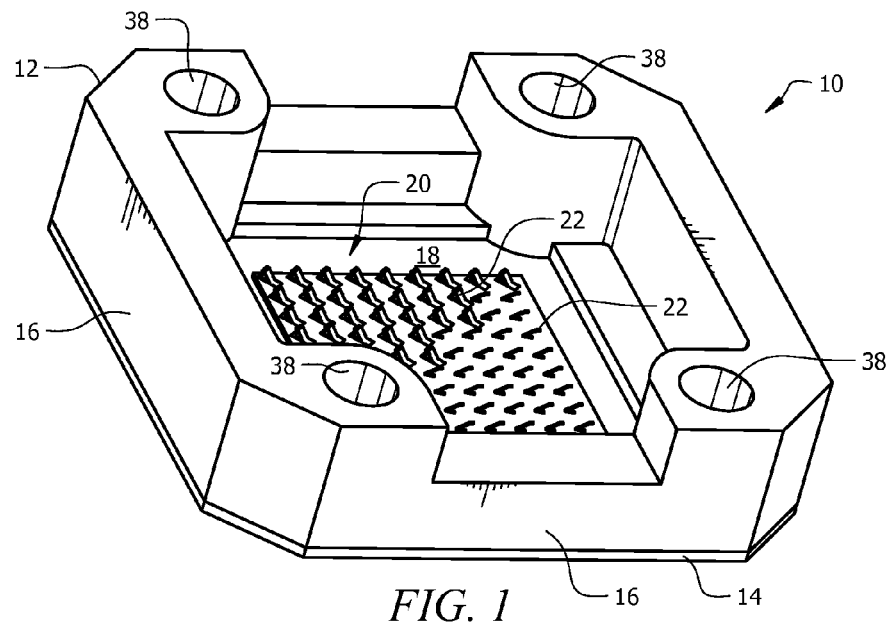
FIG. 1 is a top perspective view of a connector, in accordance with an exemplary embodiment of the present invention.
Figure 2:
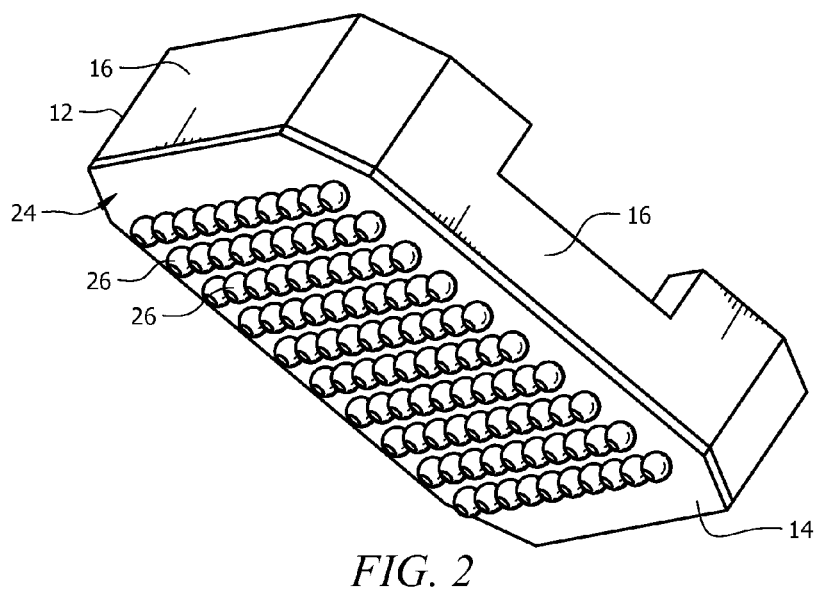
FIG. 2 is a bottom perspective view of the connector of FIG. 1.

As illustrated in FIGS. 1-4, in an exemplary or illustrative embodiment of the invention, a connector 10 includes a housing 12 and a connector circuit board 14. Housing 12 has a generally rectangular, flat, chip-like shape defined by low wall portions 16 surrounding or enclosing an inner portion 18 of housing 12. Inner portion 18 defines a socket recess through which a portion of the upper surface of connector circuit board 14 is exposed.

The upper surface 20 of connector circuit board 14 has an array of resilient conductive contacts 22. The array of resilient conductive contacts 22 is of a type known in the art as a Landing Grid Array (LGA). Each contact of the array of resilient conductive contacts 22 comprises a spring finger that extends above the upper surface of connector circuit board 14 at an acute angle with the upper surface of connector circuit board 14. That is, the base or proximal portion of each spring finger is on the upper surface of connector circuit board 14, and the distal portion of each spring finger is suspended above the upper surface of connector circuit board 14. Although in the exemplary embodiment of the invention the array of resilient conductive contacts 22 has the above-described structure, in other embodiments an array of resilient conductive contacts can have any other suitable structure. For example, in other embodiments the resilient portion can have a coiled or other curved portion and extend substantially vertically away from the upper surface of connector circuit board 14 rather than at an acute angle.

The lower surface 24 of connector circuit board 14 has a Ball Grid Array (BGA) 26 or similar array of electrical contacts. Although not shown for purposes of clarity, electrical pathways are provided through connector circuit board 14 to electrically connect the electrical contacts (balls) of BGA 26 to the electrical contacts of the array of resilient conductive contacts 22.

Figure 3:
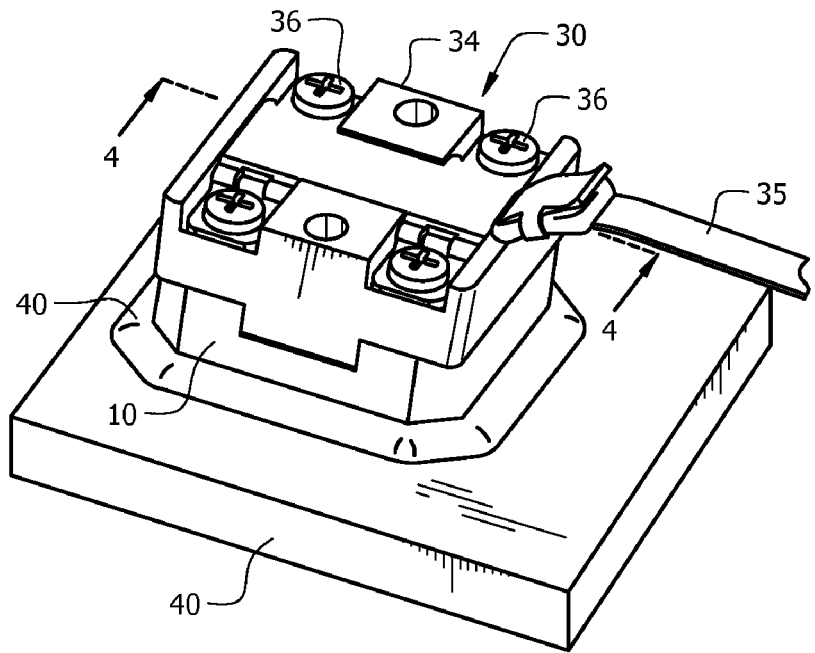
FIG. 3 is a perspective view of the connector of FIGS. 1-2, showing the connector mounted on a system circuit board and a transceiver connected to the connector.
Figure 4:
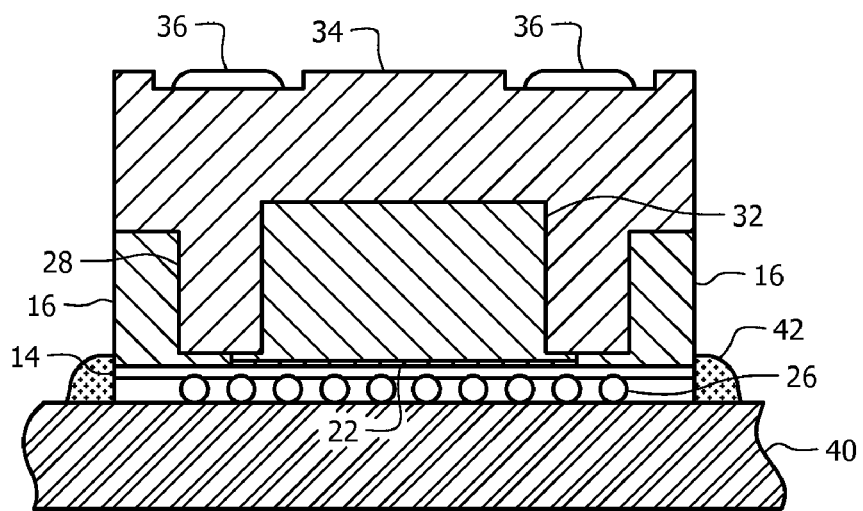
FIG. 4 is a cross-sectional view of the connector and transceiver, taken on line 4-4 of FIG. 3.
Figure 5:
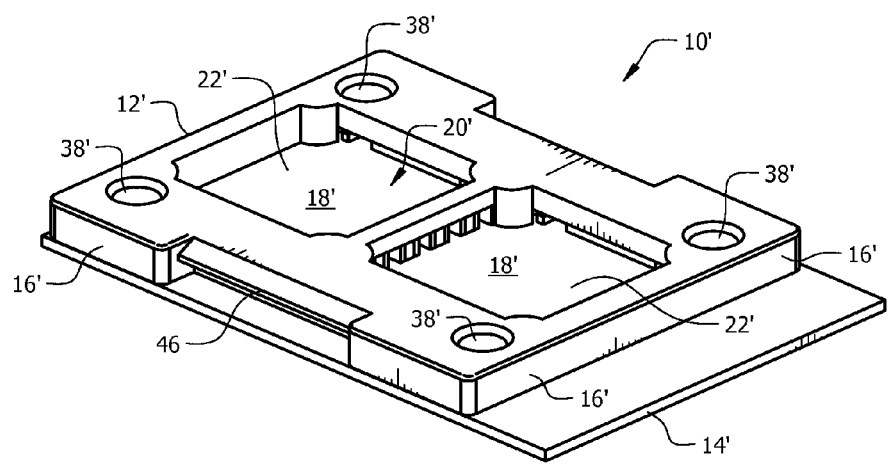
FIG. 5 is a top perspective view of a connector, in accordance with another exemplary embodiment of the present invention.

As illustrated in FIGS. 3-4, in the exemplary embodiment of the invention the shape of the base portion 28 of a transceiver module 30 corresponds or substantially conforms to the shape of the inner portion 18 (FIG. 1) of housing 12 that defines the socket recess. Although in the exemplary embodiment transceiver module 30 includes a transceiver device 32 and a heat sink 34, and base portion 28 is part of heat sink 34, in other embodiments a transceiver module can include more or fewer elements and have any other suitable configuration with a base portion that is mateable with the socket recess. An optical cable assembly 35 is shown plugged into transceiver module 30.

In FIGS. 3-4, transceiver module 30 is shown in a position in which it is mated with connector 10. In the mated position, base portion 28 of transceiver module 30 is fitted within the socket recess defined by inner portion 18 (FIG. 1). There can be, for example, a friction fit between base portion 28 of transceiver module 30 and portions of housing 12 that helps secure or stabilize transceiver module 30 and connector 10 together in this mated position. Also, in the mated position the electrical contacts of the array of resilient conductive contacts 22 are resiliently deflected or displaced by the lower surface of base portion 28 of transceiver module 30 to promote good electrical contact. Although not shown for purposes of clarity, in the mated position conductive pads on the lower surface of base portion 28 make contact with corresponding electrical contacts of the array of resilient conductive contacts 22. A means for retaining transceiver module 30 and connector 10 in the mated position, such as a screw-based fastening system, is provided to counteract the resilient or spring force exerted by the array of resilient conductive contacts 22. Screws 36 extend through holes in transceiver module 30 and engage threaded bores 38 (FIG. 1) in housing 12. Although in this embodiment the retaining mechanism comprises screws, in other embodiments any other suitable mechanism can be included.

Connector 10 is mounted on a system circuit board 40. Conventional surface-mount technology (SMT) soldering techniques can be used to electrically couple BGA 26 to corresponding pads (not shown) on the surface of system circuit board 40. As shown in FIG. 3, a bead of epoxy 42, commonly referred to as "underfill," can be added around the periphery of connector 10 to promote mechanical stability between connector 10 and system circuit board 40.

The thin, chip-like shape of connector 10 can facilitate mounting connector 10 to system circuit board 40 using SMT techniques. Connector 10 can be on the same order of size as a typical integrated circuit device such as a microprocessor. As connector 10 has a shape that is generally similar to the shape of such integrated circuit devices (i.e., flat and rectangular), the same techniques can be used to mount connector 10 as are conventionally used to mount such devices. For example, a large number of connectors 10 can be provided in bulk on a tape or reel for feeding an automated pick-and-place machine (not shown) that takes the reel-supplied components and mounts them on system circuit board 40. Thus, the same machine or same type of machine can be used to mount connector 10 on system circuit board 40 along with various other SMT components, thereby promoting manufacturing efficiency.

The thinness of connector 10 compared with some conventional transceiver connectors can also help minimize degradation of the electronic signals that are communicated between resilient conductive contacts 22 and BGA 26. Note that an electronic signal travels only the relatively short vertical distance (i.e., the thickness of connector circuit board 14) between a conductive contact 22 and a ball contact of BGA 26.

Figure 8:
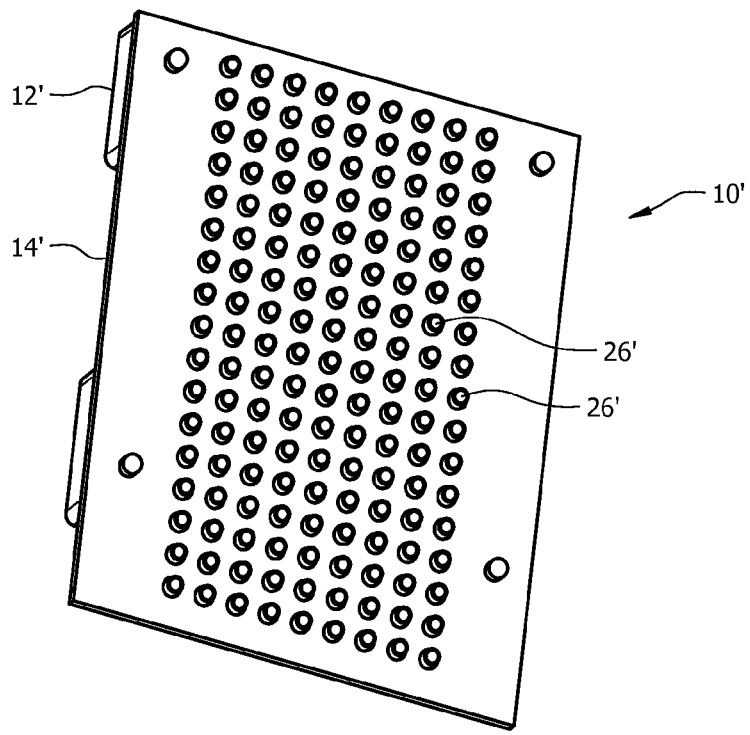
FIG. 8 is a bottom perspective view of the connector of FIGS. 5-7.

As illustrated in FIGS. 5-9, in an alternative embodiment of the invention, a connector 10' includes a housing 12' and a connector circuit board 14'. Housing 12' is similar to housing 12, which is described above with regard to the embodiment shown in FIGS. 1-4, but has two inner portions 18' that define two corresponding socket recesses through which a portion of the upper surface of connector circuit board 14' is exposed. Like upper surface 20 of connector circuit board 14 in the above-described embodiment, the upper surface 20' of connector circuit board 14' has an array of resilient conductive contacts 22' in each of the socket recesses. As illustrated in FIG. 8, the lower surface of connector circuit board 14' has a BGA 26' for mounting to a system circuit board in the same manner as in the above-described embodiment.

Figure 6:
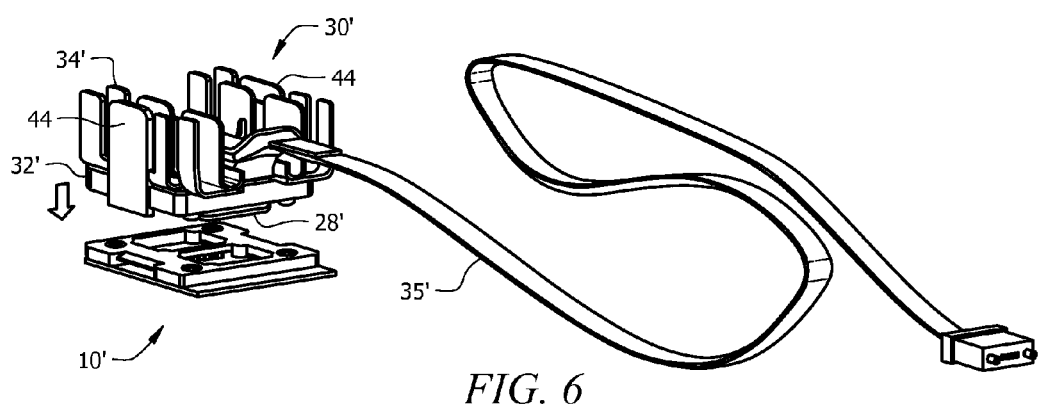
FIG. 6 is a perspective view of a transceiver module assembly, showing it being mated with the connector of FIG. 5.
Figure 7:
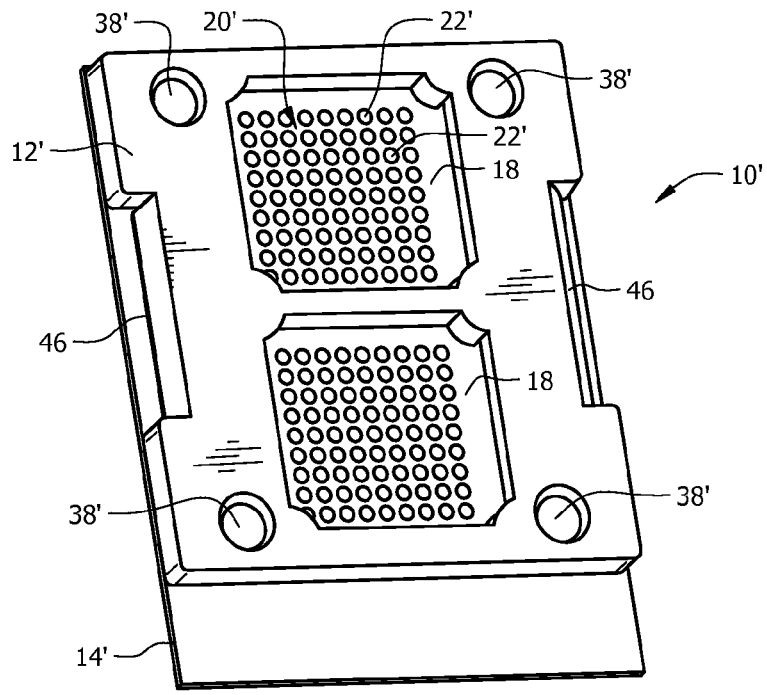
FIG. 7 is a perspective view similar to FIG. 5.

As illustrated in FIG. 6, a transceiver module 30' can be mated with connector 10' in a manner similar to that described above with regard to the embodiment shown in FIGS. 1-4. Transceiver module 30' includes two transceiver devices 32' and a heat sink 34'. An optical cable assembly 35' is shown plugged into transceiver module 30'. In this embodiment, each base portion 28' is part of a transceiver module 30'. To mate transceiver module 30' with connector 10', transceiver module 30' is first oriented in a position in which base portions 28' are aligned with the corresponding socket recesses. Then, transceiver module 30' is pressed or otherwise urged in the direction of the arrow in FIG. 6 until base portions 28' are received in the socket recesses and the resilient conductive contacts 22' make contact with the conductive pads (not shown) on the lower surface of base portions 28'. As in the embodiment described with regard to FIGS. 1-4, base portions 28' deflect or flex resilient conductive contacts 22' to promote good electrical contact. In the mated position, dual base portions 28' of transceiver module 30' are fitted securely within the corresponding socket recesses, and resilient conductive contacts 22' make contact with the conductive pads (not shown) on the lower surface of base portions 28'

Transceiver module 30' includes two spring-biased lever latches 44 that together define a locking engagement. Latches 44 can engage corresponding rim features 46 on housing 12' to retain transceiver module 30' in the above-described position in which it is mated with connector 10'. That is, latches 44 hold transceiver module 30' against connector 10' in a manner that counteracts the spring force exerted by the flexed resilient conductive contacts 22'.

Figure 9:
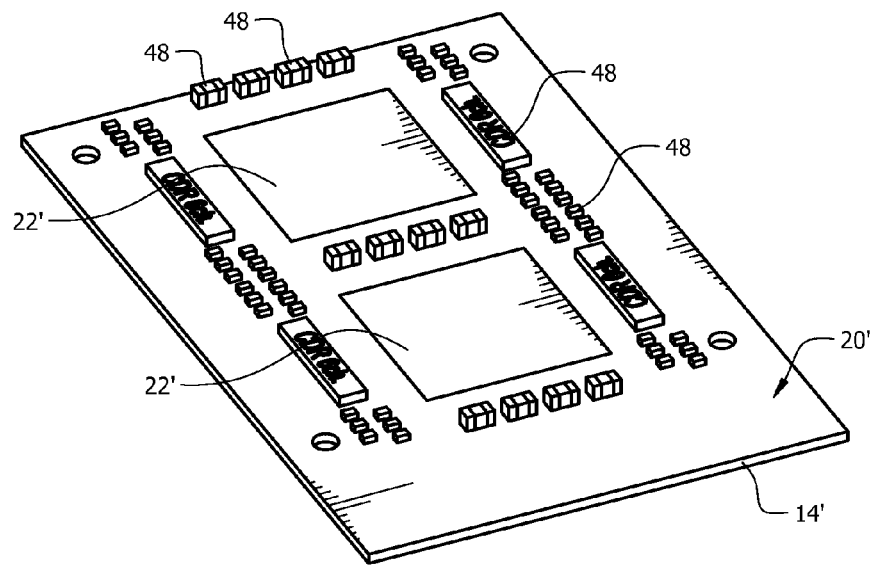
FIG. 9 is a perspective view of the connector circuit board of the connector of FIGS. 5-8.
Figure 10:
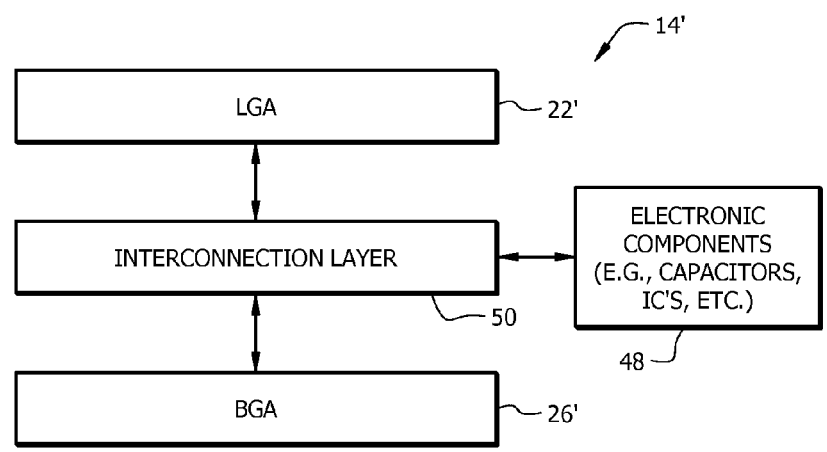
FIG. 10 is a block diagram of a connector.

As illustrated in FIG. 9, electronic circuitry (components) 48 can be mounted on upper surface 20' of connector circuit board 14'. Such circuitry can include any suitable active or passive components, such as capacitors and integrated circuit chips. As illustrated in FIG. 10, electronic circuitry 48 can be electrically coupled to BGA 26' and resilient conductive contacts 22' via one or more interconnection layers 50 within connector circuit board 14'. The circuitry can be configured to perform any suitable function of a type that would be conventionally performed by either a transceiver module itself or circuitry connected to the transceiver module, such as power supply decoupling, signal equalization, clock-data recovery, and multi-level encoding. In this manner, some of the transceiver-related functions that conventionally may be performed in a transceiver module or in an electronic system (not shown) to which a conventional transceiver module is connected, such as a switching system or processing system, can instead be performed in connector 10' in such embodiments of the present invention. Stated another way, connector 10' can serve not only as an electrical connector but also as an electronic subsystem for transceiver module 30'. Comparing FIG. 9 with FIGS. 5-7, it can be noted that portions of housing 12' cover or enclose electronic circuitry 48 and the portion of circuit board 14' on which electronic circuitry 48 is mounted. Although not shown in FIGS. 1-5, connector circuit board 14 of connector 10 of that embodiment similarly includes such circuitry.

With further regard to FIG. 10, note that the one or more interconnection layers 50 within connector circuit board 14' can be used to route a signal from any of resilient conductive contacts 22' to any of the ball contacts of BGA 26'. Thus, while in some embodiments a resilient conductive contact 22' can be connected by a vertical conductive path (not shown) in interconnection layer 50 directly to the ball contact located underneath that resilient conductive contact 22', in other embodiments interconnection layer 50 can include horizontal conductive paths (i.e., circuit traces) that route signals to different locations on connector circuit board 14'.

Figure 11:
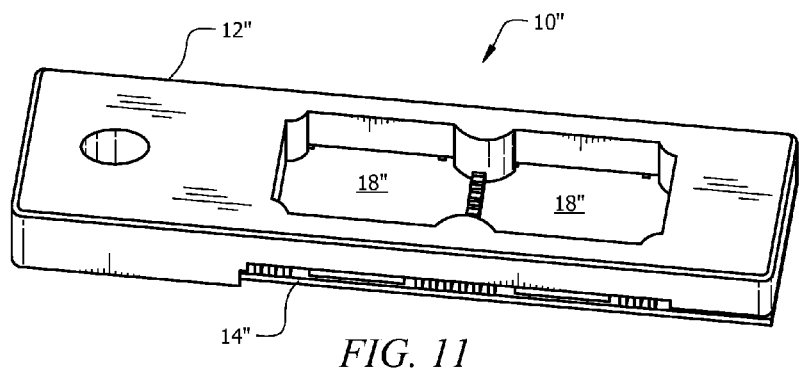
FIG. 11 is a top perspective view of a connector, in accordance with still another exemplary embodiment of the present invention.
Figure 12:
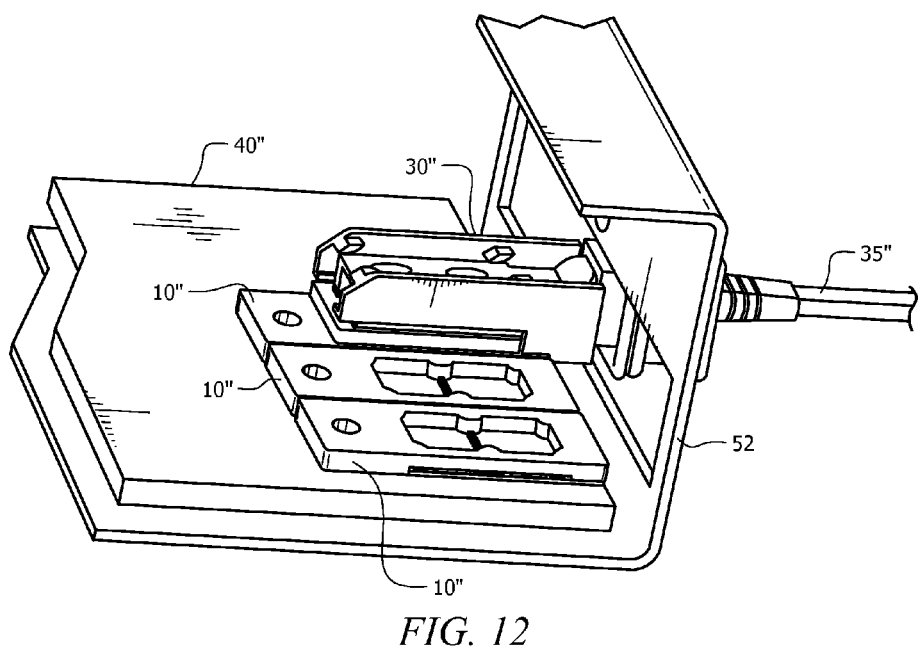
FIG. 12 is a perspective view of a transceiver module, showing it mated with the connector of FIG. 11 mounted on a system circuit board.

As illustrated in FIGS. 11-12, in another alternative embodiment of the invention, a connector 10" is similar to that described above with regard to FIGS. 5-9 but has a more elongated shape and a different means for retaining a mated transceiver module 30". Instead of having fastener connections such as threaded bores 38 (FIGS. 1-4) or a locking engagement such as lever latches 44 (FIGS. 5-7), connector 10" can have a snap-fit or similar locking engagement for retaining transceiver module 30". The base of transceiver module 30" can be introduced into the socket recess of connector 10" at a low angle, like a foot entering a shoe, and an engagement feature (not shown) on the base of transceiver module 30" can snap into or otherwise engage a mating feature (not shown) in the socket recess. One of the engagement features can act as a ramp, such that the sliding action between the mating engagement features as transceiver module 30" is moved horizontally exerts a downward force on transceiver module 30", i.e., in a direction toward a position in which transceiver module 30 is fully mated with connector 10". Introducing transceiver module 30" at a low angle in this manner may be useful in instances in which, for example, transceiver module 30" must enter an opening in a wall 52 that is perpendicular to the system circuit board 40" on which connector 10" is mounted.

One or more illustrative embodiments of the invention have been described above. However, it is to be understood that the invention is defined by the appended claims and is not limited to the specific embodiments described.

What is claimed is:

1. A connector mateable with a plurality of modules, comprising:

a housing having an upper surface, a lower surface, and a substantially planar shape, the housing having a first socket recess for receiving a base portion of a first module and having a second socket recess for receiving a base portion of a second module, the first socket recess having a shape substantially corresponding to a shape of the base portion of the first module, the second socket recess having a shape substantially corresponding to a shape of the base portion of the second module, each of the first and second modules comprising at least one of a transmitter and a receiver; and a connector circuit board having a first surface and a second surface, a first portion of the housing mounted on a portion of the first surface of the connector circuit board with the lower surface of the housing in contact with the first surface of the connector circuit board, a second portion of the housing enclosed by the first portion of the housing exposing a first portion of the first surface of the connector circuit board through the socket recess of the housing, a third portion of the housing enclosed by the first portion of the housing exposing a second portion of the first surface of the connector circuit board through the second socket recess of the housing, the exposed first portion of the connector circuit board having a first array of resilient conductive contacts corresponding to an array of conductive pads of the first module, the second surface of the connector circuit board having a first Ball Grid Array (BGA), the exposed second portion of the connector circuit board having a second array of resilient conductive contacts corresponding to an array of conductive pads of the second module, the second surface of the connector circuit board further having a second BGA.

2. The connector claimed in claim 1, wherein the connector circuit board includes circuitry coupled to the array of conductive pads and the BGA.

3. The connector claimed in claim 1, wherein the housing includes a locking engagement mateable with a corresponding portion of the transceiver module.

4. The connector claimed in claim 3, wherein the locking engagement comprises a latch.

5. The connector claimed in claim 1, wherein the housing includes a plurality of fastener connections.

6. The connector claimed in claim 5, wherein the fastener connections are threaded.

7. A method for using a connector to connect a transceiver module to a surface of a system circuit board, the connector comprising a housing mounted on a connector circuit board, the housing having a first socket recess with a shape corresponding to a shape of a base portion of a first module and a second socket recess with a shape corresponding to a shape of a base portion of a second module, the connector circuit board having a first surface and a second surface, a first portion of the housing covering a portion of the first surface of the connector circuit board, a second portion of the housing enclosed by the first portion of the housing exposing a first portion of the first surface of the connector circuit board through the first socket recess of the housing, a third portion of the housing enclosed by the first portion of the housing exposing a second portion of the first surface of the connector circuit board through the second socket recess of the housing, the exposed first portion of the connector circuit board having a first array of resilient conductive contacts corresponding to an array of conductive pads on the base portion of the first transceiver module, the second surface of the connector circuit board having a first Ball Grid Array (BGA), the exposed second portion of the connector circuit board having a second array of resilient conductive contacts corresponding to an array of conductive pads on the base portion of the second transceiver module, the second surface of the connector circuit board further having a second BGA, the method comprising:

soldering the first BGA and the second BGA to the surface of the system circuit board;

receiving the base portion of the first module in the first socket recess of the housing, the first module comprising at least one of a transmitter and a receiver;

applying a force to the first module with respect to the system circuit board to resiliently engage the first array of resilient conductive contacts of the connector circuit board with the conductive pads of the base portion of the first transceiver module;

retaining the first transceiver module in a state wherein the base portion is retained in the first socket recess of the housing and the first array of resilient conductive contacts of the connector circuit board are resiliently engaged with the conductive pads of the first module;

receiving the base portion of the second module in the second socket recess of the housing, the second module comprising at least one of a transmitter and a receiver;

applying a force to the second module with respect to the system circuit board to resiliently engage the second array of resilient conductive contacts of the connector circuit board with the conductive pads of the base portion of the second transceiver module; and retaining the second transceiver module in a state wherein the base portion is retained in the second socket recess of the housing and the second array of resilient conductive contacts of the connector circuit board are resiliently engaged with the conductive pads of the second module.

8. The method claimed in claim 7, wherein retaining the transceiver module comprises fastening the transceiver module to the connector using a plurality of fasteners.

9. The method claimed in claim 8, wherein fastening the transceiver module to the connector comprises using screws.

10. The method claimed in claim 7, wherein retaining the transceiver module comprises latching the transceiver module to the connector.

11. The method claimed in claim 10, wherein latching the transceiver module to the connector comprises actuating a lever latch.

\* \* \* \* \*